(12) United States Patent
Fernando et al.

(10) Patent No.: US 11,101,834 B2
(45) Date of Patent: Aug. 24, 2021

(54) APPARATUS AND METHOD FOR DETECTING LATERAL ELECTROMAGNETIC EXPOSURE AND DEVICE GRIP FOR CONTROLLING SIGNAL TRANSMISSION

(71) Applicant: QUALCOMM Incorporated, San Diego, CA (US)

(72) Inventors: Udara Fernando, San Diego, CA (US); Lin Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/696,743

(22) Filed: Nov. 26, 2019

(65) Prior Publication Data

US 2020/0177223 A1    Jun. 4, 2020

Related U.S. Application Data

(60) Provisional application No. 62/773,987, filed on Nov. 30, 2018.

(51) Int. Cl.
*H04B 1/3827* (2015.01)
*H01Q 1/24* (2006.01)
*H04W 52/28* (2009.01)

(52) U.S. Cl.
CPC ........... *H04B 1/3838* (2013.01); *H01Q 1/243* (2013.01); *H01Q 1/245* (2013.01); *H04W 52/28* (2013.01)

(58) Field of Classification Search
CPC . H04W 52/288; H04W 52/367; H04W 52/28; H04B 7/0691; H04B 17/18;
(Continued)

(56) References Cited

U.S. PATENT DOCUMENTS 8,798,695 B1    8/2014  Zheng et al.
8,886,247 B1 *  11/2014 Price ................... H04W 52/362
                                                            455/522
(Continued)

OTHER PUBLICATIONS

International Search Report and Written Opinion—PCT/US2019/063610—ISAEPO—dated Aug. 27, 2020.
(Continued)

*Primary Examiner* — Lee Nguyen
(74) *Attorney, Agent, or Firm* — Loza & Loza, LLP (57) ABSTRACT

An apparatus including a housing; sensors configured to sense one or more locations upon which a user is gripping the housing; sensors including antenna modules configured to transmit a signal based on the one or more locations upon which the user is gripping the housing. Another aspect relates to an apparatus including a housing; a set of antenna modules situated proximate at different surface locations along the housing; and a controller configured to operate the set of antenna modules to determine at least one or more electromagnetic leakage coupling between at least one pair of antenna modules of the set. In this aspect, the controller may be configured to select one or more of the set of antenna modules for transmitting a signal based on the one or more electromagnetic leakage coupling associated with one or more of the different locations where a user grips the housing, respectively.

22 Claims, 8 Drawing Sheets

(58) Field of Classification Search
CPC .... H04B 7/0825; H04B 1/3838; H01Q 1/245; H01Q 1/243
USPC ..................................................... 455/575.5
See application file for complete search history.

(56) References Cited

U.S. PATENT DOCUMENTS

| | | | |
|---|---|---|---|
| 9,854,540 B2 * | 12/2017 | Sun ........................ | H04B 17/12 |
| 10,467,438 B1 * | 11/2019 | Renner ................. | G01N 27/227 |
| 2012/0190398 A1 * | 7/2012 | Leukkunen .......... | H04B 7/0691 |
| | | | 455/522 |
| 2013/0148636 A1 | 6/2013 | Lum et al. | |
| 2013/0156080 A1 * | 6/2013 | Cheng .................... | H01Q 21/28 |
| | | | 375/222 |
| 2017/0356980 A1 | 12/2017 | Islam et al. | |

OTHER PUBLICATIONS

Partial International Search Report—PCT/US2019/063610—ISA/EPO—dated May 12, 2020.

\* cited by examiner

EXPOSURE-LIMIT-COMPLIANT MAX TRANSMIT POWER FOR ANTENNA MODULE 1

| ANT_MOD1 | BEAM 1 | BEAM 2 | BEAM 3 | • • • | BEAM M |
|---|---|---|---|---|---|
| ANT_MOD2 | $Tx_{max121}$ | $Tx_{max122}$ | $Tx_{max123}$ | • • • | $Tx_{max12M}$ |
| ANT_MOD3 | $Tx_{max131}$ | $Tx_{max132}$ | $Tx_{max133}$ | • • • | $Tx_{max13M}$ |
| ⋮ | | | | | |
| ANT_MODN | $Tx_{max1N1}$ | $Tx_{max1N2}$ | $Tx_{max1N3}$ | • • • | $Tx_{max1NM}$ |

⋮

EXPOSURE-LIMIT-COMPLIANT MAX TRANSMIT POWER FOR ANTENNA MODULE N

| ANT_MOD1 | $Tx_{maxN11}$ | $Tx_{maxN12}$ | $Tx_{maxN13}$ | • • • | $Tx_{maxN1M}$ |
|---|---|---|---|---|---|
| ANT_MOD2 | $Tx_{maxN21}$ | $Tx_{maxN22}$ | $Tx_{maxN23}$ | • • • | $Tx_{maxN2M}$ |
| ANT_MOD3 | $Tx_{maxN31}$ | $Tx_{maxN32}$ | $Tx_{maxN33}$ | • • • | $Tx_{maxN3M}$ |
| ⋮ | | | | | |
| ANT_MODN | BEAM 1 | BEAM 2 | BEAM 3 | • • • | BEAM M |

APPARATUS AND METHOD FOR DETECTING LATERAL ELECTROMAGNETIC EXPOSURE AND DEVICE GRIP FOR CONTROLLING SIGNAL TRANSMISSION

CROSS-REFERENCE TO RELATED APPLICATION

This application claims priority to the filing date of U.S. Provisional Application Ser. No. 62/773,987, filed on Nov. 30, 2018, which is incorporated herein by reference.

FIELD

Aspects of the present disclosure relate generally to wireless devices configured to reduce electromagnetic exposure to users, and in particular, to a wireless device configured to self-detect lateral electromagnetic exposure and device grip for controlling signal transmission.

DESCRIPTION OF RELATED ART

A wireless device, such as a cellular telephone, tablet device, or other, transmits a signal to a target device, such as a base station, wireless router, or other device, for communicating data to the target device. The transmitted signal is an electromagnetic signal. Since a user is typically holding the wireless device during signal transmission, the user is exposed to the electromagnetic signal.

Exposure to electromagnetic signals may cause physiological harm to users. Because of risk of adverse health effects due to electromagnetic exposure, many governmental bodies, such as the Federal Communication Commission (FCC), prescribe a maximum electromagnetic exposure parameter. For example, for cellular telephone applications, the FCC has adopted a limit for Specific Absorption Rate (SAR) of 1.6 watts per kilogram. SAR is the measurement of the amount of radio frequency energy absorbed by a body when using a cellular telephone. Such limit may also be referred to as Maximum Permissible Exposure (MPE) limit.

The present disclosure relates to techniques for ensuring electromagnetic transmission by wireless device are performed in a manner consistent with such electromagnetic exposure limits.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus including a housing; a set of sensors configured to sense one or more locations on the housing upon which a user is gripping the housing, wherein the set of sensors comprises a set of antenna modules, respectively, wherein at least one of the set of antenna modules is configured to transmit a signal based on the one or more locations upon which the user is gripping the housing.

Another aspect of the disclosure relates to a method of transmitting a signal. The method includes sensing, using a set of antenna modules, one or more locations on a housing upon which a user is gripping the housing; and transmitting the signal, by at least one of the antenna modules, based on the one or more locations upon which the user is gripping the housing.

Another aspect of the disclosure relates to an apparatus including a housing; a set of antenna modules situated proximate different surface locations along the housing; and a controller configured to operate the set of antenna modules to determine at least one or more electromagnetic leakage coupling between at least one pair of antenna modules of the set.

Another aspect of the disclosure relates to the aforementioned controller being configured to select one or more of the set of antenna modules for transmitting a signal based on the one or more electromagnetic leakage coupling associated with one or more of the different locations where a user grips the housing, respectively.

Another aspect of the disclosure relates to a method of transmitting a signal. The method includes operating a set of antenna modules located proximate different surface locations of a housing to determine one or more electromagnetic leakage coupling between one or more different pairs of antenna modules of the set, respectively; and transmitting the signal based on the one or more electromagnetic leakage coupling.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In summary, one aspect of the present disclosure relates to self-detecting by a wireless device lateral electromagnetic exposure across the surface of the wireless device. In this regard, the wireless device includes a set of antenna modules, each configured as a phased-array antenna for directionally transmitting and receiving electromagnetic signals. The set of antenna modules may be physically located proximate different exterior surfaces of a casing or housing of the wireless device; and such locations may be chosen to coincide with locations where a user may grip the wireless device.

For performing self-detection of lateral electromagnetic exposure, one of the antenna module of the set is configured to transmit an electromagnetic signal with a certain power (e.g., a defined maximum transmit power level), and the remaining antenna module(s) of the set are configured to receive the electromagnetic signal. The coupling or leakage between the transmitting antenna module and the receiving antenna module(s) is measured by the power or voltage level (i.e., a parameter) of the signal received by the receiving antenna modules.

As mentioned above, the surface locations on the wireless device proximate the receiving antenna modules are potential locations where a user may grip the wireless device. Thus, by determining the coupling or leakage between the transmitting antenna module and the receiving antenna module(s), a determination can be made of the maximum transmit power level for the transmitting module that meets the electromagnetic exposure limit (e.g., SAR or MPE limit) at the locations of the receiving module(s).

The self-detecting lateral electromagnetic exposure is performed for each antenna module of the set being configured as the transmitter and the remaining antenna module(s) being configured as the receiver. For example, in the case where a wireless device includes a set of three (3) antenna modules, a first leakage test is performed with antenna module 1 being the transmitter and antenna modules 2 and 3 being the receivers; a second leakage test is performed with antenna module 2 being the transmitter and antenna modules 1 and 3 being the receivers; and a third leakage test is performed with antenna module 3 being the transmitter and antenna modules 1 and 2 being the receivers.

Further, the self-detecting lateral electromagnetic exposure is performed for a set of antenna radiation or beam forming patterns that each antenna module is able to transmit. Taking again the previous example, if each antenna module is configured to generate a set of different radiation beams aimed at different directions, a first set of leakage tests is performed with antenna module 1 being the transmitter and transmitting a set of signals in accordance with the set of radiation beam patterns, and antenna modules 2 and 3 being the receivers; a second set of leakage tests is performed with antenna module 2 being the transmitter and transmitting a set of signals in accordance with the set of radiation beam patterns, and antenna modules 1 and 3 being the receivers; and a third set of leakage tests is performed with antenna module 3 being the transmitter and transmitting a set of signals in accordance with the set of radiation beam patterns, and antenna modules 1 and 2 being the receivers.

As a result of performing the self-detecting lateral electromagnetic exposure tests, a table may be created that provides an exposure-limit-compliant maximum transmit power level for each antenna module and each of its radiation beam patterns to ensure the electromagnetic exposure for each location of the other antenna module(s) (i.e., potential grip location(s)) complies with the exposure limit. Using the table, a wireless device may determine the one or more locations on the wireless device where a user is gripping or touching the device, and then transmits a signal in accordance with the grip location(s) to ensure that the exposure limit at those locations is not exceeded. The above concepts are further explained below with reference to the following exemplary implementations.

Figure 1A:
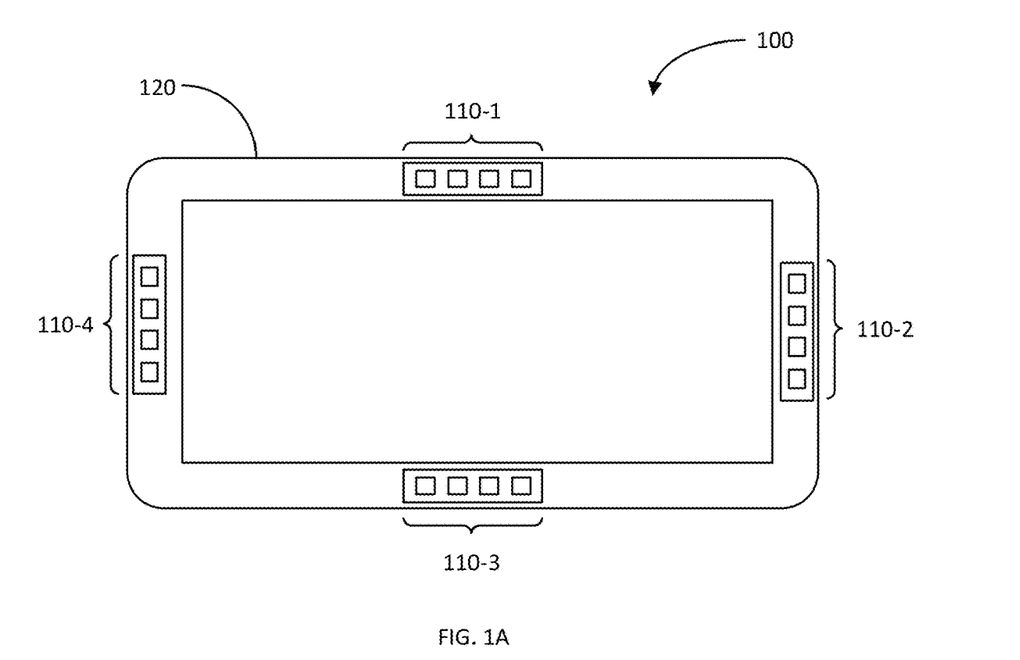
FIG. 1A illustrates a front view of an exemplary wireless device in accordance with an aspect of the disclosure.

FIG. 1A illustrates a front view of an exemplary wireless device 100 in accordance with an aspect of the disclosure. In this example, the wireless device 100 is implemented as a cellular smart telephone, but it shall be understood that the wireless device may be implemented as other types of wireless device. It shall be further understood that the wireless device 100 may be configured to transmit and receive signals in accordance with 5G (fifth generation of cellular network technology specified by 3GPP (3rd Generation Partnership Project)), including transmitting and receiving signals in the millimeter wave (mmW) frequency range. Further, in this example, the wireless device 100 is configured to have four (4) antenna modules 110-1, 110-2, 110-3, and 110-4 located on four (4) sides of a housing 120 of the wireless device, respectively. It shall be understood that the wireless device 100 may have more or less antenna modules, and may be situated in different locations on the housing 120 of the wireless device.

Each of the antenna modules 110-1 to 110-4 may be configured as a phased array antenna including four (4) transmit chains, four (4) receive chains, and four (4) antennas. It shall be understood that the phased array antenna may include more or less than four (4) transmit/receive chains and corresponding antennas. As a phased array antenna, each of the antenna modules 110-1 to 110-4 may be configured to transmit electromagnetic signals with a set of different radiation or beamforming patterns for improved transmission along different directions.

Further, each of the surface locations of the housing 120 of the wireless device 100 proximate the antenna modules 110-1 to 110-4 is a potential location where a user may grip the wireless device during use and while the device is transmitting an electromagnetic signal. Thus, it would be useful to determine the leakage or coupling between the antenna modules 110-1 to 110-4 so that each of the antenna modules is able to transmit a signal while a user is gripping the housing 120 of the wireless device 100 at such one or more locations so that the electromagnetic exposure to the user complies with the exposure limit.

Figure 1B:
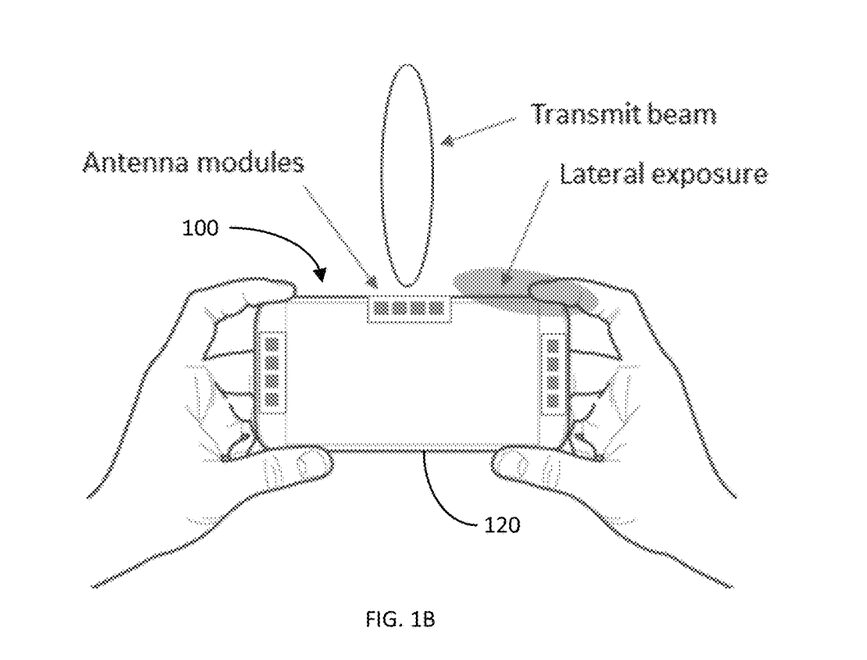
FIG. 1B illustrates a front view of an exemplary wireless device being gripped by a user in accordance with another aspect of the disclosure.

FIG. 1B illustrates a front view of an exemplary wireless device 100 being gripped by a user in accordance with another aspect of the disclosure. In this example, the wireless device 100 is gripped by a user with both hands where antenna modules 110-2 and 110-4 are substantially co-located within the housing 120. As illustrated, the signal transmission by antenna module 110-1 with a broadside or normal radiation beam may produce lateral electromagnetic exposure to the user's right hand as specifically indicated, as well as to the user's left hand.

Figure 2A:
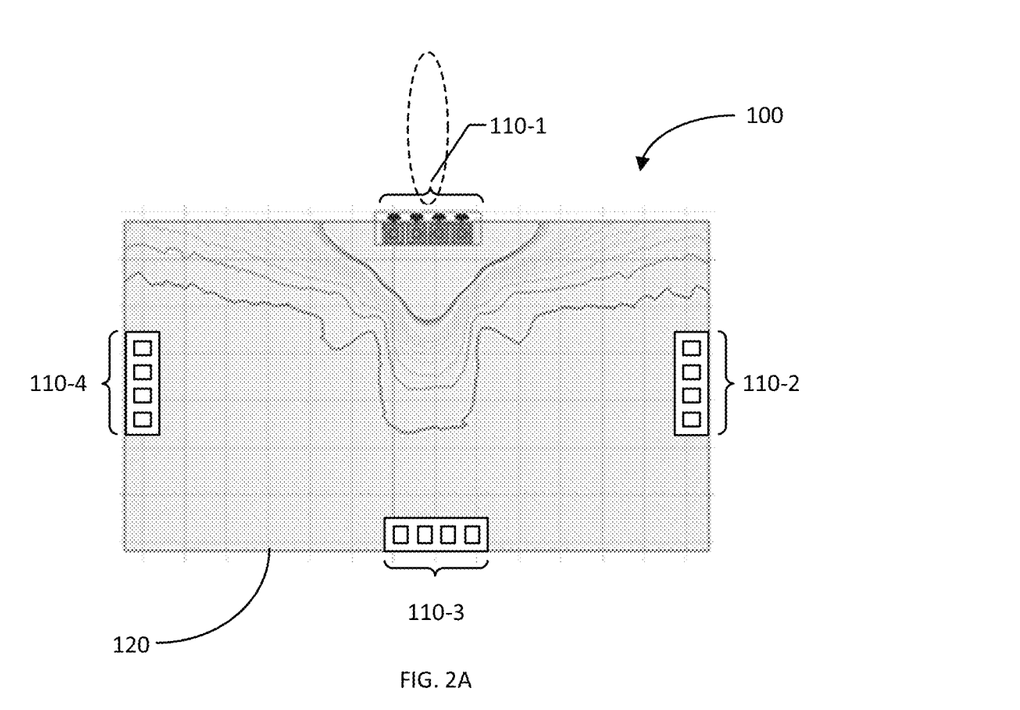
FIG. 2A illustrates a graph depicting exemplary contour lines of equal electromagnetic power density across a surface of a wireless device due to a signal transmission by one of a set of antenna modules in a normal beam direction in accordance with another aspect of the disclosure.

FIG. 2A illustrates a graph depicting exemplary contour lines of equal electromagnetic power densities across a surface of the housing 120 of the wireless device 100 due to a signal transmission by antenna module 110-1 with a broadside or normal radiation beam in accordance with another aspect of the disclosure. Each of the contour lines represent a certain electromagnetic power density across the surface of the housing 120 of the wireless device 100.

The contour line closest to antenna module 110-1 represents the power density on the surface of the housing 120 of the wireless device 100 that corresponds to the exposure limit. The surface region of the housing 120 of the wireless device 100 between the contour line closest to the antenna module 110-1 and the transmitting antenna module 110-1 is where the electromagnetic power density exceeds the exposure limit, which may be referred to herein as the "keep-out zone." The surface region of the housing 120 of the wireless device 100 outside of the "keep-out zone" is where the electromagnetic power density is below the exposure limit.

As the power of the signal transmitted by antenna module 110-1 increases, the keep-out zone expands in directions towards the other antenna modules 110-2, 110-3, and 110-4. At some transmit power of the signal, the keep-out zone expands into the location of at least one of the antenna modules 110-2, 110-3, and 110-4. It would be desirable to know what transmit powers corresponds to when the keep-out zone expands into the locations of the antenna modules 110-2, 110-3, and 110-4, respectively. As the housing locations proximate the antenna modules 110-2, 110-3, and 110-4 are potential grip locations of the wireless device 100, determining those transmit powers will be useful in tailoring the transmission of the signal to ensure that the electromagnetic exposure to the user complies with the exposure limit.

As an example, if it is determined that the transmit powers that results in the keep-out zone expanding to the locations of the antenna modules 110-2, 110-3, and 110-4 are 20 dBm, 18 dBm, and 19 dBm, respectively, with the current normal radiation beam, and if it is also determined that the user grip is touching the housing 120 proximate the locations of antenna modules 110-2 and 110-4, then the maximum transmit power for that radiation beam to ensure exposure limit compliance would be less (e.g., by a safety margin) than 19 dBm. This ensures that the power density at the locations of the housing 120 proximate the antenna modules 110-2 and 110-4 do not exceed the exposure limit. Although, in this example, the power density at the housing location of the antenna module 110-3 exceeds the exposure limit, as the user is not touching that location while gripping the wireless device 100, the transmission of the signal at a safety margin below the 19 dBm complies with the exposure limit.

Figure 2B:
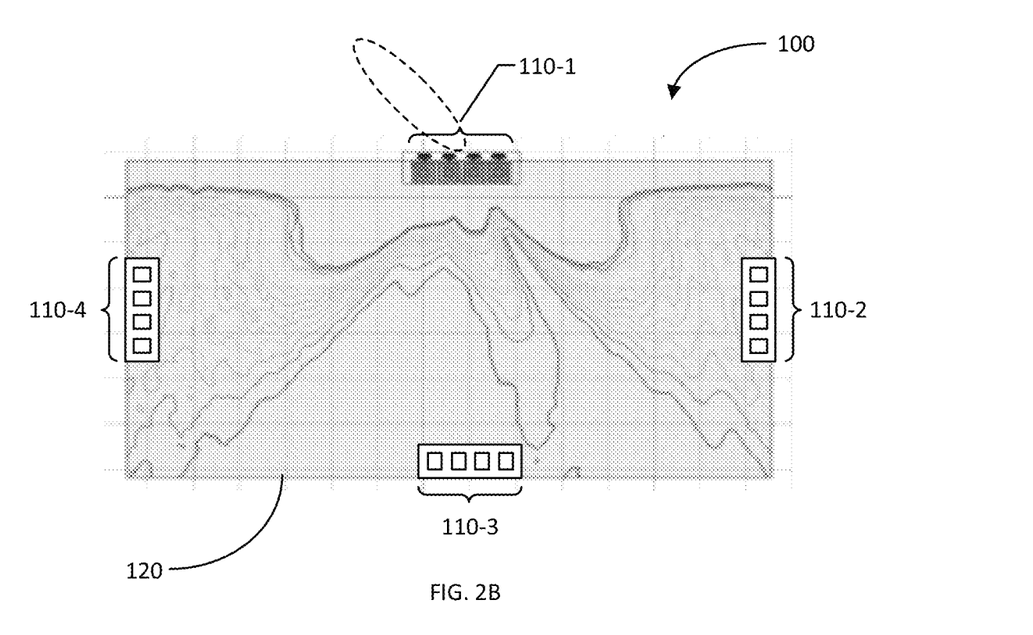
FIG. 2B illustrates a graph depicting exemplary contour lines of equal electromagnetic power density across a surface of a wireless device due to a signal transmission by one of a set of antenna modules in a non-normal beam direction in accordance with another aspect of the disclosure.

FIG. 2B illustrates a graph depicting exemplary contour lines of electromagnetic power density across a surface of the housing 120 of the wireless device 100 due to a signal transmission by antenna module 110-1 in a non-normal (e.g., 45 degree from normal) beam direction in accordance with another aspect of the disclosure. As illustrated, the equal power density contour lines across the surface of housing 120 of the wireless device 100 varies with the direction of the electromagnetic radiation beam used to transmit the signal by the antenna module 110-1. For instance, in this example, the non-normal radiation beam causes the keep-out zone to expand more towards the locations of the housing 120 proximate the antenna modules 110-2 and 110-4 than towards the location of the housing 120 proximate the antenna module 110-3, as compared to the keep-out zone associated with the normal radiation beam.

Thus, for exposure limit compliance, the measurement of the maximum transmit power (or leakage/coupling between the antenna modules) should be performed for a set of different radiation beams Considering the example above, if it is determined that the transmit powers that result in the keep-out zone expanding to the locations of the housing 120 proximate the antenna modules 110-2, 110-3, and 110-4 are 17 dBm, 21 dBm, and 18 dBm, respectively, with the current non-normal radiation beam, and if it is also determined that the user grip is touching the locations of the housing 120 proximate the antenna modules 110-2 and 110-4, then the maximum transmit power for that radiation beam to ensure exposure limit compliance would be less (e.g., by a safety margin) than 17 dBm. This ensures that the power density at the locations of the housing 120 proximate the antenna modules 110-2 and 110-4 do not exceed the exposure limit. In contrast, in this example, the power density at the location of the antenna module 110-3 is at least 4 dB below the exposure limit, but it is irrelevant to the transmission of the signal as the user is not touching that location while gripping the wireless device 100.

Although, in the above examples, antenna module 110-1 served as the transmitting module and antenna modules 110-2 to 110-4 served as the receiving module, it shall be understood that the determination of the exposure-limit-compliant maximum transmit powers shall be performed for each of the antenna modules 110-1 to 110-4 serving as the transmitting module and the other modules serving as the receiving modules.

Figure 3:
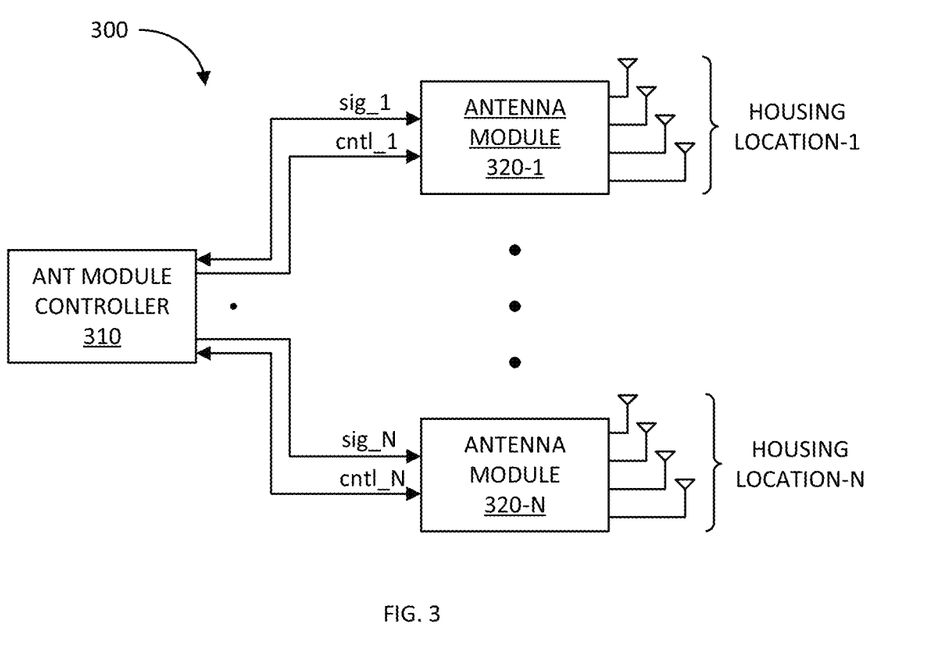
FIG. 3 illustrates a block diagram of an exemplary wireless device in accordance with another aspect of the disclosure.

FIG. 3 illustrates a block diagram of an exemplary wireless device 300 in accordance with another aspect of the disclosure. The wireless device 300 may be a more general and exemplary detailed implementation of the wireless device 100 previously discussed.

The wireless device 300 includes an antenna module controller 310 coupled to a set of antenna modules 320-1 to 320-N. The controller 310 may be coupled to the set of antenna modules 320-1 to 320-N via a set of signal transmission lines sig_1 to sig_N and a set of control lines cntl_1 to cntl_N, respectively. As illustrated, the antenna modules 320-1 to 320-N are located proximate exterior surface locations 1-N of a housing of the wireless device 300, respectively.

In accordance with the determination of all exposure-limit-compliant maximum transmit power measurements, the antenna module controller 310 sends a test signal to one of the antenna modules 320-1 to 320-N configured as the transmitting module for the measurement via the corresponding signal transmission line (one of sig_1 to sig_N), and receives signals from the antenna modules configured as the receiving module(s) resulting from the test signal via the other corresponding signal transmission lines (the other sig_1 to sig_N).

Similarly, in accordance with the determination of all exposure-limit-compliant maximum transmit power measurements, the antenna module controller 310 sends a control signal to one of the antenna modules 320-1 to 320-N to configure it as the transmitting module for the measurement via the corresponding control line (one of cntl_1 to cntl_N), and sends control signals to the other antenna module(s) to configure it/them as receiving module(s) via the other corresponding control lines (the other of cntl_1 to cntl_N).

Figure 4:
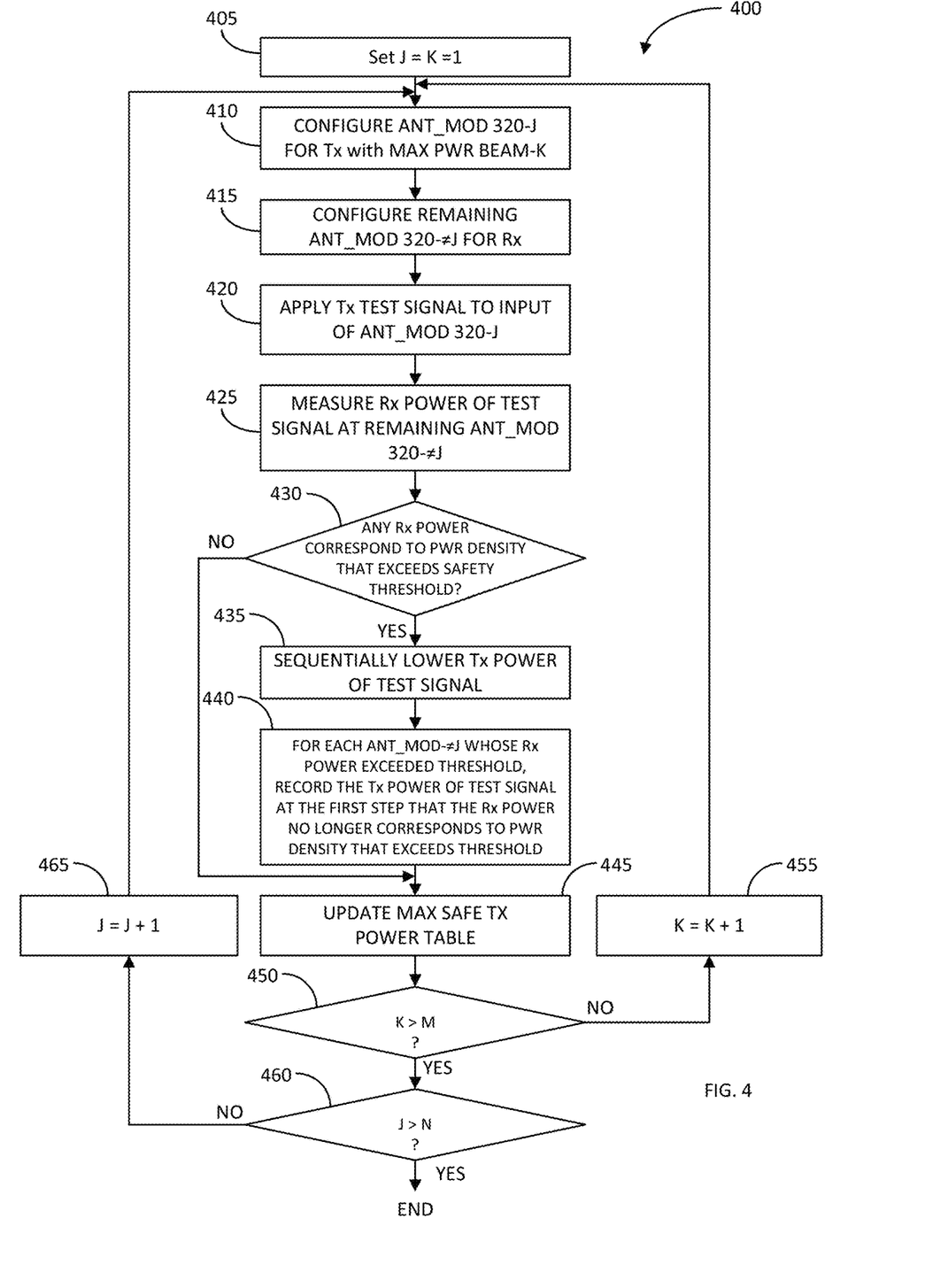
FIG. 4 illustrates a flow diagram of an exemplary method of self-detecting lateral exposure in a wireless device in accordance with another aspect of the disclosure.

FIG. 4 illustrates a block diagram of an exemplary method 400 of self-detecting lateral exposure in the wireless device 300 in accordance with another aspect of the disclosure. According to the method 400, the antenna module controller 310 sets initial variables J and K to a value of one (1) (block 405). The variable J identifies the antenna module that will serve as the transmitting module for the current test cycle; and the remaining antenna modules will serve as the receiving module(s). The variable K identifies the particular transmission radiation beam for the current test cycle.

Then, according to the method 400, the antenna module controller 310 configures the antenna module 320-J for transmitting an electromagnetic signal in accordance with radiation beam K at maximum transmit power (block 410). The controller 310 may perform this configuration by sending a control signal to the antenna module 320-J via the control line cntl_J.

Then, according to the method 400, the antenna module controller 310 configures the remaining antenna module(s) 320-≠J for receiving electromagnetic signal (block 415). The controller 310 may perform this configuration by sending control signal(s) to the antenna module 320-≠J via the control line(s) cntl_≠J.

Then, according to the method 400, the antenna module controller 310 applies a test signal to the transmitting antenna module 320-J (block 420). The controller 310 may apply the test signal via the corresponding signal transmission line sig_J. In response to the test signal, the transmitting antenna module 320-J transmits an electromagnetic signal, and the receiving antenna module(s) receive the electromagnetic signal. The controller 310 may obtain the received test signals from the receiving antenna module(s) 320-≠J via the corresponding signal line(s) sig≠J.

Then, according to the method 400, the antenna module controller 310 determines or measure the power or voltage level (i.e., parameter) of the received test signal at the receiving antenna module(s) 320-J (block 425). The leakage or coupling between the transmitting antenna module 320-J and the one or more receiving antenna module(s) 320-J may be based on the one or more differences between the transmit power of the test signal and the one or more received power of the received signals, respectively. The one or more received power may be mapped to one or more power densities at the one or more locations of the housing proximate the one or more receiving antenna module(s) 320-J. A power density corresponding to the exposure limit may also be determined based on measurements at the surface of the housing of the wireless device 300 with appropriate electromagnetic measuring equipment.

Then, according to the method 400, the antenna module controller 310 determines whether any of the one or more measured power densities exceed the power density that corresponds to the exposure limit (block 430). If none of the one or more measured power density exceeds the exposure limit, the controller 310 updates a table to indicate that the transmit power of the test signal is exposure-limit-compliant for transmitting antenna module 320-J transmitting radiation beam K at all housing locations proximate the receiving one or more antenna module(s) location(s)-≠J (block 445).

If one or more of the measured power densities at the one or more receiving antenna(s) location(s)-≠J exceed the power density corresponding to the exposure limit, the antenna module controller 310 sequentially (in steps (e.g., 1 dB)) lowers the transmit power of the test signal (block 435). At the first step that one or more measured power densities fall below the power density corresponding to the exposure limit, the controller 310 records the corresponding one or more transmit powers of the test signal (block 440).

Then, according to the method 400, the antenna module controller 310 updates the table with the transmit power in block 440 (block 445). At the end of this test cycle, the table should include the exposure-limit-compliant maximum transmit power for transmitting antenna module 320-J transmitting a signal with radiation beam K for ensuring that the electromagnetic exposure at the one or more housing location(s)-≠J of the other antenna module(s)-≠J complies with the exposure limit. If the method 400 took a direct route from block 430 to block 445, the maximum transmit power of the test signal is exposure-limit-compliant for all of the one or more housing location(s)-≠J. If the method 400 took a route from block 430 to block 445 via block 435 and 440, one or more different (lower) transmit power of the test signal is exposure-limit-compliant for one or more housing location(s)-≠J, respectively.

Then, according to the method 400, the antenna module controller 310 determines whether the current radiation beam K is greater than M, the number of different radiation beams for which the measurement is to be performed (block 450). If the controller 310 determines that K is not greater than M (which means there are more radiation beams for which the measurement is to be performed), the controller increments K by one (1) (block 455) so that the measurement is performed based on the next radiation beam, and returns to block 410 to repeat the measurement operations for the next radiation beam. If, on the other hand, the controller 310 determines that K is greater than M (which means that the measurement has been performed for all of the radiation beams for antenna module 320-J), the controller determines whether current transmitting antenna module J is greater than N, the number of different antenna modules that need to be configured as the transmitter for the measurement (block 460).

If, in block 460, the controller 310 determines that J is not greater than N (which means there are more antenna module(s) that need to be configured as the transmitter for which the measurement needs to be performed), the controller increments J by one (1) (block 465) so that the measurement is performed based on the next antenna module being the transmitting module, and returns to block 410 to repeat the measurement operations for the next transmitting antenna module. If, on the other hand, the controller 310 determines that J is greater than N (which means all the antenna modules has served as transmitting modules and all corresponding beams have been used in the measurement), the method 400 ends.

At the end of the method 400, the antenna module controller 310 should have a table of all exposure-limit-compliant transmission powers corresponding to each antenna module for each radiation beam and for each of the one or more antenna module housing location(s).

Figure 5:
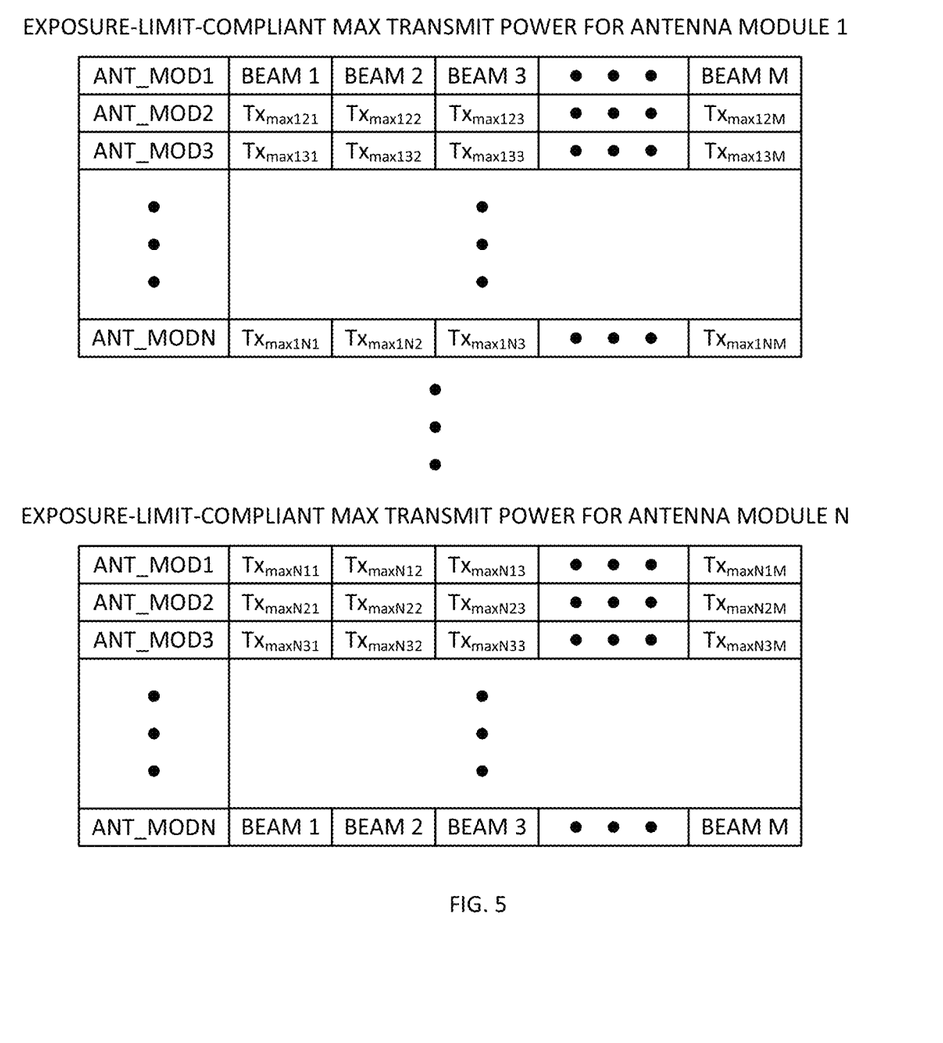
FIG. 5 illustrates a diagram of an exemplary table providing exposure-limit compliant maximum transmission power for different antenna modules and their corresponding different radiation beams in accordance with another aspect of the disclosure.

FIG. 5 illustrates a diagram of an exemplary table of all exposure-limit-compliant maximum transmission power for different antenna modules and their corresponding different radiation beams in accordance with another aspect of the disclosure. The upper sub-table provides all of the exposure-limit-compliant transmit powers for antenna module 320-1 serving as the transmitting antenna.

As an example, if antenna module 320-1 is configured to transmit a signal using radiation beam 1, and a user's grip of the housing of the wireless device 300 touches locations proximate antenna modules 2 and 3, then the exposure-limit-compliant transmit power is the lesser of transmit power $Tx_{max121}$ and $Tx_{max131}$. The first indices of the transmit power represents the transmitting antenna module, the second indices represent the receiving antenna module location, and the third indices represents the particular radiation beam. The exposure-limit-compliant transmit power is the lesser of the transmit power $Tx_{max121}$ and $Tx_{max131}$ because choosing the greater one would result in an exposure-limit violation at the other antenna module location.

Taking another example, if antenna module 320-1 is configured to transmit a signal using radiation beam 3, and a user's grip of the housing of the wireless device 300 touches locations proximate antenna modules 3 and N, then the exposure-limit-compliant transmit power is the lesser of transmit power $Tx_{max133}$ and $Tx_{max1N3}$.

The lower sub-table provides all of the exposure-limit-compliant transmit power for antenna module 320-N serving as the transmitting antenna. As an example, if antenna module 320-N is configured to transmit a signal using radiation beam M, and a user's grip of the housing of the wireless device 300 touches locations proximate antenna modules 1 and 3, then the exposure-limit-compliant transmit power is the lesser of transmit power $Tx_{maxN1M}$ and $Tx_{maxN3M}$. Considering another example, if antenna module 320-N is configured to transmit a signal using radiation beam M, and a user's grip of the housing of the wireless device 300 touches locations proximate antenna modules 2 and 3, then the exposure-limit-compliant transmit power is the lesser of transmit power $Tx_{maxN2M}$ and $Tx_{maxN3M}$.

If the number of antenna modules N is more than two (2), then there would be corresponding one or more sub-table(s) pertaining to the one or more antenna module(s) that may serve as a transmitting antenna modules(s). As discussed below, the antenna module controller 310 may use the table to select the antenna module, radiation beam, and transmit power for transmitting a signal based on the one or more locations on the surface of the housing of the wireless device 300 upon which a user grips the device.

Figure 6:
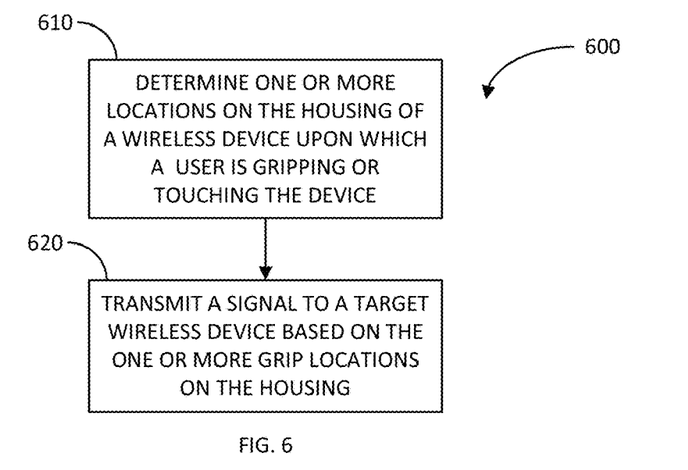
FIG. 6 illustrates a flow diagram of an exemplary method of transmitting a signal based on how a user is gripping a wireless device in accordance with another aspect of the disclosure.

FIG. 6 illustrates a flow diagram of an exemplary method 600 of transmitting a signal based on how a user is gripping the housing of the wireless device 300 in accordance with another aspect of the disclosure. According to the method 600, the antenna module controller 310 determines one or more locations on the housing of the wireless device 300 upon which a user is gripping or touching the wireless device (block 610).

Then, according to the method 600, the antenna module controller 310 transmits a signal to one or more wireless devices based on the one or more grip locations on the wireless device housing (block 620). This may entail selecting one or more antenna modules for transmitting the signal, selecting one or more radiation beams associated with the selected one or more transmitting antenna modules, and selecting one or more power levels associated with the selected one or more radiation beams, respectively. As discussed, using the table depicted in FIG. 5, the antenna module controller 310 causes the transmission of the signal such that the electromagnetic exposure to the user, based on how the user is gripping the housing of the wireless device 300, complies with exposure defined limit requirements.

Figure 7:
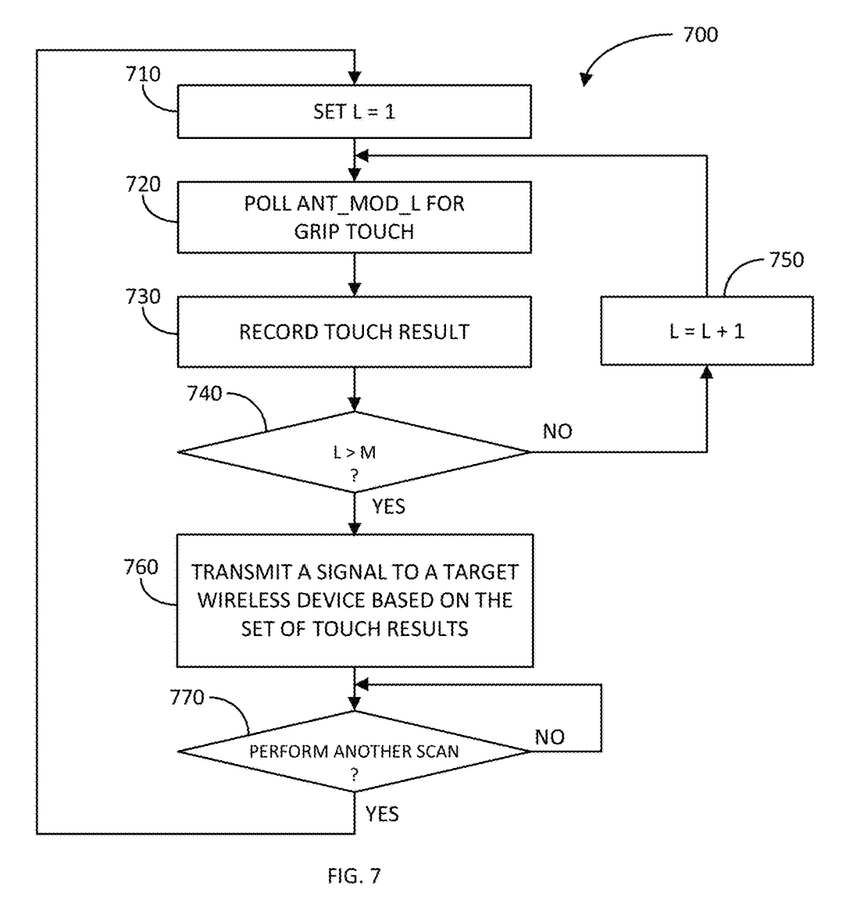
FIG. 7 illustrates a flow diagram of another exemplary method of transmitting a signal based on how a user is gripping a wireless device in accordance with another aspect of the disclosure.

FIG. 7 illustrates a flow diagram of another exemplary method 700 of transmitting a signal based on how a user is gripping a housing of a wireless device in accordance with another aspect of the disclosure.

According to the method 700, the antenna module controller 310 sets a variable L to one (1) (block 710). The variable L identifies the current one (320-L) of the antenna modules 320-1 to 320-N to be polled to determine whether a user's grip is touching the surface of the housing of the wireless device 300 proximate the current antenna module 320-L. As an example, the antenna module controller 310 may cause a polling signal to be sent to the current antenna module 320-L to determine whether the user is touching the housing of the wireless device 300 at the location proximate antenna module 320-L. For example, the user's hand may affect the phase of the polling signal, which may be received via its received chain for touch detection. As the antenna module controller 310 has initialized L to one (1), the current antenna module to be polled for user touch is antenna module 320-1.

Then, according to the method 700, the antenna module controller 310 polls the current antenna module for grip touch (block 720). The antenna module controller 310 records the touch result for the polled current antenna module (block 730). The antenna module controller 310 then determines whether the variable L is greater than the value M, the number of antenna modules to be polled for user touch (block 740). If the controller 310 determines that the variable L is less than or equal to M, then the controller increments L by one (1) (block 750) and proceeds to block 720 to perform polling of the next antenna module for user touch.

If, in block 740, the antenna module controller 310 determines that L is greater than M (meaning all of the antenna modules have been polled for user touch), the controller 310 transmits a signal to one or more target wireless devices based on the set of touch results (block 760). Again, this may entail selecting one or more antenna modules for transmitting the signal, selecting one or more antenna radiation beams associated with the selected one or more transmitting antenna modules, and selecting one or more transmit power levels associated with the selected one or more antenna beams. As discussed, using the table depicted in FIG. 5, the antenna module controller 310 causes the transmission of the signal such that the electromagnetic exposure to the user, based on how the user is gripping the housing of the wireless device 300, complies with exposure limit requirements.

Figure 8:
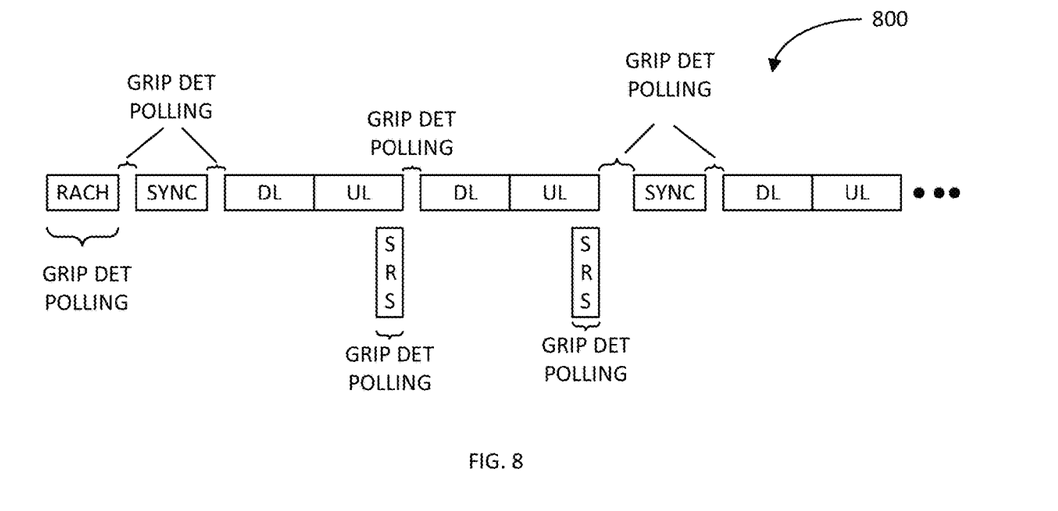
FIG. 8 illustrates a diagram of a signal transmission and reception frame configured to detect how a user is currently gripping a wireless device in accordance with another aspect of the disclosure.

FIG. 8 illustrates a diagram of a signal transmission and reception frame 800 configured to detect how a user is currently gripping a wireless device in accordance with another aspect of the disclosure. The frame 800 includes a random-access channel (RACH) field, a synchronization field, a downlink (DL) session, an uplink (UL) session including sounding reference signal (SRS) field. As illustrated, the polling of the antenna modules 320-1 to 320-N, as discussed above, may be performed during the RACH field, during an SRS field, or during any transmission gap.

Figure 9:
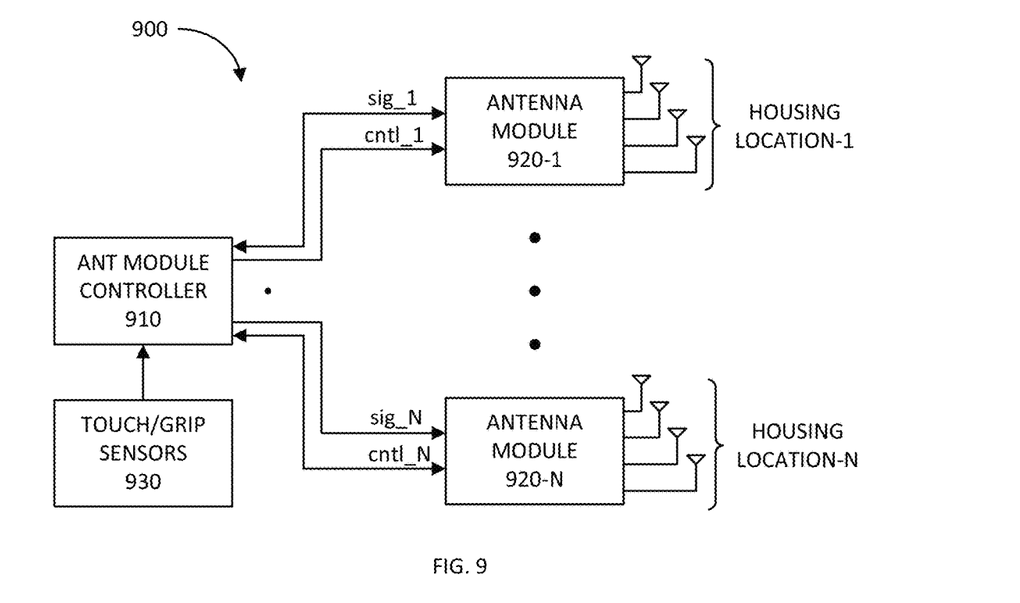
FIG. 9 illustrates a block diagram of another exemplary wireless device in accordance with another aspect of the disclosure.

FIG. 9 illustrates a block diagram of another exemplary wireless device 900 in accordance with another aspect of the disclosure. The wireless device 900 is similar to that of wireless device 300, in that it includes an antenna module controller 910 coupled to a set of antenna modules 920-1 to 920-N via sets of signal and control lines sig_1-sig_N and cntl_1-cntl_N, respectively. In contrast, the wireless device 900 further includes touch/grip sensors 930 positioned at various locations on the housing of the wireless device for sensing user grip touch, apart or in combination with the polling of the antenna modules 920-1 to 920-N for user touch. The touch/grip sensors 930 may include capacitive sensors or may be part of the touchscreen display for sensing user grip configuration.

Figure 10:
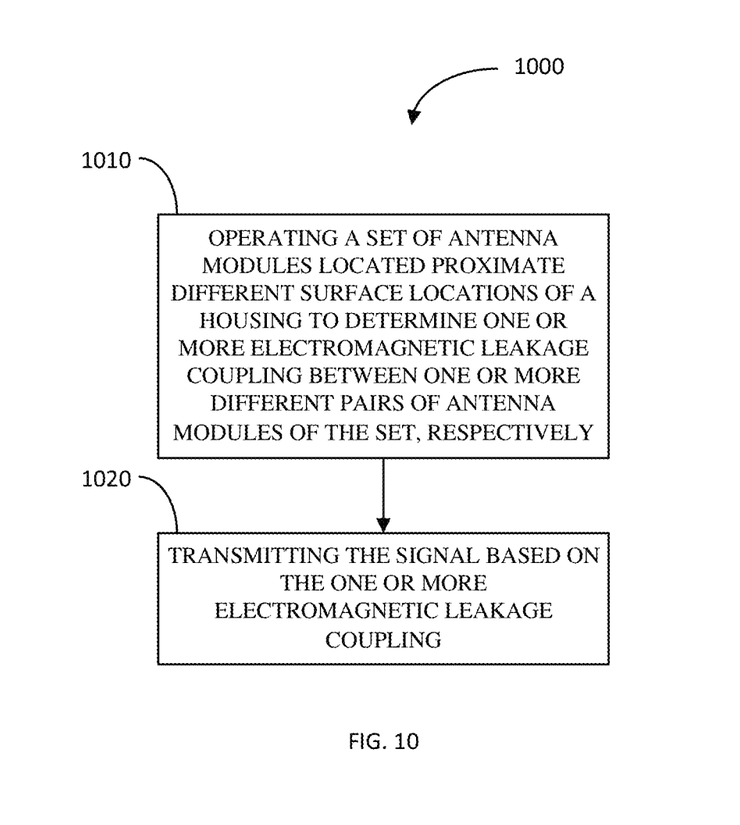
FIG. 10 illustrates a flow diagram of an exemplary method of transmitting a signal in accordance with another aspect of the disclosure.

FIG. 10 illustrates a flow diagram of an exemplary method 1000 of transmitting a signal in accordance with another aspect of the disclosure. The method 1000 includes operating a set of antenna modules located proximate different surface locations of a housing to determine one or more electromagnetic leakage coupling between one or more different pairs of antenna modules of the set, respectively (block 1010). The method 1000 further includes transmitting the signal based on the one or more electromagnetic leakage coupling (block 1020).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
   a housing;
   a set of antenna modules; and
   an antenna module controller configured to:
      send a set of polling signals to the set of antenna modules, respectively, to determine one or more locations upon which a user is gripping the housing; and
      transmit a signal to one or more target wireless devices based on the determined one or more locations upon which the user is gripping the housing.

2. The apparatus of claim 1, wherein the antenna module controller is configured to transmit the signal using a selected one or more of the set of antenna modules to ensure that one or more power density of the signal at the one or more locations upon which the user is gripping the housing is at or below a defined limit.

3. The apparatus of claim 1, wherein the antenna module controller is configured to transmit the signal using at least one of the set of antenna modules with at least one of a set of radiation beams aimed at different directions, respectively, selected based on the determined one or more locations upon which the user is gripping the housing.

4. The apparatus of claim 1, wherein the antenna module controller is configured to transmit the signal using at least one of the set of antenna modules with a power level based on the determined one or more locations upon which the user is gripping the housing.

5. The apparatus of claim 1, wherein the antenna module controller is configured to transmit the signal using at least one of the set of antenna modules selected to transmit the signal based on the determined one or more locations upon which the user is gripping the housing.

6. The apparatus of claim 1, wherein the antenna module controller is configured to send the polling signals to the set of antenna modules during a sounding reference signal (SRS) field of a signal transmission or reception frame.

7. The apparatus of claim 1, wherein the antenna module controller is configured to send the polling signals to the set of antenna modules during a random-access channel (RACH) field of a signal transmission or reception frame.

8. A method of transmitting a signal, comprising:
   sending a set of polling signals to a set of antenna modules, respectively, to determine one or more locations upon which a user is gripping a housing; and
   transmitting the signal to one or more target wireless devices based on the one or more locations upon which the user is gripping the housing.

9. The method of claim 8, wherein said transmitting the signal comprises transmitting the signal using a selected one or more of the set of antenna modules such that one or more power density of the signal at the one or more locations upon which the user is gripping the housing is at or below a defined limit.

10. The method of claim 8, wherein said transmitting the signal comprises transmitting the signal using at least one antenna module with one of a set of radiation beams aimed at different directions, respectively, selected based on the determined one or more locations upon which the user is gripping the housing.

11. The method of claim 8, wherein said transmitting the signal comprises transmitting the signal using at least one of the set of antenna modules with a power level based on the determined one or more locations upon which the user is gripping the housing.

12. The method of claim 8, further comprising selecting at least one of the set of antenna modules for transmitting the signal based on the determined one or more locations upon which the user is gripping the housing.

13. An apparatus, comprising:
   a housing;
   a set of antenna modules situated proximate different surface locations along the housing; and
   a controller configured to:
      operate the set of antenna modules to determine one or more electromagnetic leakage coupling between at least one pair of antenna modules of the set;
      determine one or more locations on a housing upon which a user is gripping the housing proximate at least one of the set of antenna modules; and
      transmit a signal to one or more target wireless devices based on the determined one or more electromagnetic leakage coupling and the determined one or more locations upon which the user is gripping the housing proximate the one or more of the set of antenna modules.

14. The apparatus of claim 13, wherein the controller is configured to select one or more of the set of antenna modules for transmitting the signal based on the one or more electromagnetic leakage coupling associated with one or more of the different locations where the user grips the housing, respectively.

15. The apparatus of claim 14, wherein the controller is configured to select the one or more antenna modules to ensure that one or more power density of the signal at the one or more locations upon which the user is gripping the housing is at or below a defined limit.

16. The apparatus of claim 14, wherein the controller is configured to select one or more radiation beams for transmitting the signal by the one or more antenna modules based on the one or more locations upon which the user is gripping the housing, respectively.

17. The apparatus of claim 14, wherein the controller is configured to select one or more power levels for transmitting the signal by the one or more antenna modules based on the one or more locations upon which the user is gripping the housing, respectively.

18. A method of transmitting a signal, comprising:
operating a set of antenna modules located proximate different surface locations of a housing to determine one or more electromagnetic leakage coupling between one or more different pairs of antenna modules of the set, respectively;
determining one or more locations upon which a user is gripping the housing proximate at least one of the set of antenna modules; and
transmitting the signal based on the determined one or more electromagnetic leakage coupling and the determined one or more locations upon which the user is gripping the housing proximate the one or more of the set of antenna modules.

19. The method of claim 18, wherein said transmitting the signal comprises transmitting the signal based on one or more of the different locations upon which the user is gripping the housing, respectively.

20. The method of claim 18, further comprising selecting one or more antenna modules for transmitting the signal based on the one or more electromagnetic leakage coupling and one or more locations upon which the user is gripping the housing.

21. The method of claim 18, further comprising selecting one or more radiation beams for transmitting the signal based on the one or more electromagnetic leakage coupling and the one or more locations upon which the user is gripping the housing.

22. The method of claim 18, further comprising selecting one or more power levels for transmitting the signal based on the one or more electromagnetic leakage coupling and the one or more locations upon which the user is gripping the housing.

* * * * *